Patented Sept. 2, 1952

2,609,394

UNITED STATES PATENT OFFICE 2,609,394

PRODUCTION OF AMINES

Phineas Davies, Peter William Reynolds, Robert Reid Coats, and Arthur William Charles Taylor, Norton-on-Tees, England, assignors to Imperial Chemical Industries Limited, a corporation of Great Britain No Drawing. Application December 8, 1949, Serial No. 131,918. In Great Britain January 7, 1949

3 Claims. (Cl. 260—585)

This invention relates to a process of amination.

It is known to produce aliphatic amines by continuously reacting an open chain primary or secondary aliphatic mono-alcohol containing from 2 to 8 carbon atoms in the vapour phase in the presence of hydrogen at a temperature between 150 and 230° C. in the presence of a metallic catalyst, for example metallic nickel or cobalt. We have found, however, that the efficiency of both these types of catalyst is very sensitive to change in temperature, for example a change of 2° when aminating n-propanol, at 195° C. had a pronounced effect on a nickel catalyst; that they both tend to give rapid onset of exothermic side reactions at high temperatures; and that, unless high hydrogen ratios, which necessarily result in low outputs, are used, it is difficult to vaporise the higher alcohols, e. g. heptanols and octanols.

We have now found that copper catalysts, especially foraminate copper catalysts, show improvement over nickel and cobalt catalysts in the first two respects, that they can be used to give high conversions and yields at temperatures of 240° C. and above, and that at these temperatures the higher alcohols can be vaporised more readily, thus giving a greater output.

According to the present invention there is provided a process for the production of amines which comprises passing a saturated aliphatic primary alcohol containing from 2 to 9 carbon atoms in the molecule or the corresponding aldehyde, or a saturated aliphatic secondary alcohol containing from 2 to 9 carbon atoms in the molecule or the corresponding ketone or cyclohexanol and its homologues, or the corresponding ketones, containing up to 9 carbon atoms in the molecule or tetrahydrofurfuryl alcohol or tetrahydrofurfural together with ammonia and hydrogen in the vapour phase at a temperature of at least 240° C. and preferably less than 300° C. over an active copper catalyst especially a foraminate copper catalyst. According to the invention mono- di- or tri- amines may be produced.

According to the process of the invention, for example, the ethylamines, n-propylamines, n-butylamines and the nonylamines may be produced from ethanol, n-propanol, n-butanol and nonanol (e. g. 3,5,5-trimethylhexanol) respectively, or from the corresponding aldehydes. In similar manner the iso-propylamines, iso-butylamines, cyclohexylamines, methylcyclohexylamines, and dimethylhexylamines respectively may be produced from iso-propanol, iso-butanol, cyclohexanol, methylcyclohexanol and dimethyl-cyclohexanol, or from acetone, ethyl methyl ketone, cyclohexanone methylcyclohexanone or dimethylcyclohexanone, respectively. Tetrahydrofurfurylamine may be produced from tetrahydrofurfuryl alcohol or tetrahydrofurfural in similar manner. The process gives especially valuable results with ethanol.

The preferred range of temperature is between 260° and 285° C., and it is in general desirable not to operate above 300° C. The process may be conducted at atmospheric pressure or at superatmospheric pressures permitting vapour phase operation. A suitable range of pressure is for example from 10 to 25 atmospheres gauge.

The molar ratio of hydrogen to alcohol, or other starting material is selected to give good operating conditions and although it may be within the range 1:10 to 100:1, will in general be within the range 1:1 to 10:1, and preferably within the range 2:1 to 4:1. The molar ratio of ammonia to alcohol may suitably be within the range 1:1 to 10:1, and preferably from 2:1 to 4:1. It is desirable that the molar ratios of hydrogen and ammonia respectively to oxygenated reactant be at least 1:2. If it is desired to produce monamine as primary product the proportion of ammonia to oxygenated product will be raised to at least 4 moles per mole.

While active copper catalysts such as for example copper-on-kieselguhr, copper-on-zinc oxide, copper-on-alumina and copper chromite are suitable, it is preferred on account of the greater conversions and yields to employ foraminate copper catalysts.

By the term "foraminate catalyst" as used in this specification is meant one comprising particles or pieces, for example granules prepared by crushing, of an alloy comprising the desired catalytically active metal or metals together with one or more other metals more soluble in acid or alkali or other extracting liquid than the desired catalytically active metal or metals, said alloy comprising at least one phase in which atoms of the desired catalytically active metal or metals and of the aforesaid more soluble metal or metals are on the same crystal lattice and said particles or pieces having a robust core of alloy and an outer active layer having a skeletal structure resulting from the partial or complete removal by the extracting liquid of the more soluble metal or metals from the aforesaid phase or phases in said outer layer. The particles or pieces may be prepared in various ways, for example by crushing the cool alloy, and may be of various sizes, but are preferably ⅛" to ¼".

Foraminate copper/aluminium and copper/silicon catalysts are both very suitable, but it is preferred to employ copper/aluminium on account of the tendency for copper/silicon catalysts to agglomerate, especially at temperatures in excess of 300° C. Very effective foraminate catalysts can be prepared from copper/aluminium alloys with a weight ratio of from 40:60 to 75:25 of Cu:Al by extraction of up to 70% by weight of the aluminium originally present by aqueous alkali, for example caustic soda, and from copper/silicon alloys with a weight ratio of from 80:20 to 92:8 of Cu:Si by extraction in a similar manner of up to 50% by weight of the silicon. It is preferred for best activity in the catalyst to extract at least 20% of the extractible metal initially. Foraminate copper/aluminium catalysts with a weight ratio of 55:45 Cu:Al and foraminate copper/silicon catalysts with a weight ratio of 85:15 Cu:Si have been found to be particularly suitable in the process of the invention.

These foraminate catalysts can be used effectively at the aforesaid temperatures. With catalysts of this type which have been in use for some time the optimum operating temperature is about 270° C.

Suitable space velocities are from 0.1 to 0.5 litre of liquid alcohol fed per litre of bulk catalyst volume per hour.

Preferably the activated catalyst is treated before use with a soluble alkaline earth basic compound, especially barium hydroxide, for example as a warm 10% solution. The catalyst is preferably well impregnated with the alkaline earth compound, which can be achieved by soaking it in the treating solution for a number of hours, e. g. 10. While it is preferred to employ barium hydroxide, calcium and strontium hydroxides may also be used. Other alkaline earth metal compounds capable of being dissolved in a solvent having no deleterious effect on the catalyst, and not causing further aluminium extraction to a substantial extent, and not contaminating the catalyst with undesirable ions, such as chloride or sulphate, may be used. If desired, the activated catalyst may be impregnated by continuously passing the solution over the catalyst. The advantage connected with the alkaline earth compound treatment is that any dehydrating effect associated with the foraminate catalyst is neutralised or substantially reduced. This applies especially to catalysts prepared from aluminium alloys, which almost always contain some alumina remaining after caustic extraction. In this way dehydration of oxygenated starting material to olefine can be very much reduced or even substantially eliminated. The catalyst is retreated with alkaline earth metal compound after each reactivation.

Water may or may not be present in the reaction mixture.

In this specification "pass conversion" means the total proportion of the specified alcohol consumed per pass expressed as a percentage; and yield, the amount of useful products expressed as a percentage of that theoretically obtainable from the alcohol consumed.

The following examples, in which the parts are by weight unless otherwise stated, illustrate the manner in which the invention is to be performed.

*Example 1*

100 parts of ethanol azeotrope containing 95 parts of ethanol, 1 part of tri-ethylamine, and 4 parts of water, was passed over a foraminate copper/aluminium catalyst (which had been treated with a 5% solution of barium hydroxide octahydrate), at a liquid space velocity of 0.2 litre per litre of bulk catalyst volume per hour at a temperature of 240° C. and a pressure of 250 lbs. per square inch, together with 45 parts of ammonia and 21 parts of hydrogen. The catalyst graded between ⅛" and ¼" aperture meshes and was prepared by extracting pieces of an alloy containing 55% copper and 45% aluminium with dilute aqueous caustic soda, until 20% by weight of the aluminium originally present had been removed.

*Example 2*

Ethanol together with hydrogen in a proportion of 4.5 moles, and ammonia in a proportion of 0.9 mole, per mole of alcohol, was passed over a foraminate copper aluminium catalyst (which had been treated with a 5% solution of barium hydroxide octahydrate) at 260° C. under 17 atmospheres gauge at a liquid space velocity of 0.23 litre per litre of bulk catalyst volume per hour. The catalyst graded between ⅛" and ¼" aperture meshes, and was prepared by extracting with aqueous caustic soda at least 20% of the original aluminium content of an alloy containing 55% Cu and 45% Al by weight.

The liquid product had the percentage composition by volume:

| | |
|---|---|
| Monoethylamine | 13 |
| Diethylamine | 35 |
| Triethylamine | 19 |
| Ethanol | 5 |
| Water | 28 |

The pass conversion was 94% and the yield 92%, based on ethanol.

*Example 3* n-Propanol together with hydrogen in a proportion of 2.8 moles, and ammonia in a proportion of 1.2 moles, per mole of propanol was passed over the foraminate copper/aluminium catalyst which was used in Example 2, at 240° C. under 17 atmospheres gauge at a liquid space velocity of 0.23 similarly expressed.

The liquid product had the percentage composition by volume:

| | |
|---|---|
| Mono-n-propylamine | 17 |
| Di-n-propylamine | 49 |
| Tri-n-propylamine | 8 |
| n-Propanol | 3 |
| Water | 23 |

The pass conversion was 96% and the yield 95%, based on propanol.

*Example 4* n-Butanol together with hydrogen in a proportion of 3:1 moles, and ammonia in a proportion of 1.25 moles, per mole of butanol was passed over the foraminate copper aluminium catalyst, which was used in Example 2, at 250° C. and under 17 atmospheres gauge pressure at a liquid space velocity of 0.22 similarly expressed.

The liquid product had the following percentage composition by volume:

| | |
|---|---|
| Mono-n-butylamine | 17 |
| Di-n-butylamine | 52 |
| Tri-n-butylamine | 12 |
| n-Butanol | 3.5 |
| Water | 15.5 |

The pass conversion was 96% and the yield 97%, based on butanol.

Example 5

Ethanol together with hydrogen in a proportion of 1.5 moles and ammonia in a proportion of 2.2 moles per mole of ethanol was passed over a foraminate copper/silicon catalyst (which had been treated with a 5% solution of barium hydroxide octahydrate) at 280° C. under 17 atmospheres gauge pressure at a liquid space velocity of 0.21 similarly expressed. The catalyst graded between ⅛" and ¼" aperture meshes, and was prepared by extracting with aqueous caustic soda at least 20% of the original silicon content of an alloy containing 85% of copper and 15% of silicon.

The liquid product had the composition by volume:

| | |
|---|---|
| Mono-ethylamine | 29 |
| Di-ethylamine | 30 |
| Tri-ethylamine | 7 |
| Ethanol | 6 |
| Water | 28 |

The pass conversion was 92% and the yield 93%, based on ethanol.

Example 6 n-Propanol together with hydrogen in a proportion of 1.8 moles and ammonia in a proportion of 2.07 moles, per mole of propanol was passed over the foraminate copper-silicon catalyst that was used in Example 5 at 270° C. under 17 atmospheres gauge pressure at a liquid space velocity of 0.25 similarly calculated.

The liquid product had the composition by volume:

| | |
|---|---|
| Mono-n-propylamine | 22 |
| Di-n-propylamine | 44 |
| Tri-n-propylamine | 7 |
| n-Propanol | 6 |
| Water | 21 |

The pass conversion was 92% and the yield 92%, based on n-propanol.

We claim:

1. A process for the production of amines which comprises passing an aliphatic mono-alcohol containing from 2 to 9 carbon atoms together with ammonia and hydrogen in the vapor phase at a temperature within the range 240–300° C. and at a pressure of from 10 to 25 atmospheres gauge over an active foraminate copper catalyst treated with an alkaline earth metal basic compound.

2. A process for the production of amines as set forth in claim 1 wherein the temperature range is from 260° to 285° C.

3. A process for the production of amines as set forth in claim 1 wherein the relative proportions of ammonia and hydrogen to the aliphatic mono-alcohol are from 2 moles to 4 moles per mole thereof.

PHINEAS DAVIES.
PETER WILLIAM REYNOLDS.
ROBERT REID COATS
ARTHUR WILLIAM CHARLES TAYLOR.

REFERENCES CITED

The following references are of record in the file of this patent:

UNITED STATES PATENTS

| Number | Name | Date |
|---|---|---|
| 2,053,193 | Guinot | Sept. 1, 1936 |
| 2,166,971 | Schmidt | July 25, 1939 |

FOREIGN PATENTS

| Number | Country | Date |
|---|---|---|
| 422,563 | Great Britain | Jan. 10, 1935 |